United States Patent
Han et al.

(10) Patent No.: US 11,038,393 B2
(45) Date of Patent: Jun. 15, 2021

(54) STATOR FOR DRIVING MOTOR

(71) Applicants: HYUNDAI MOTOR COMPANY, Seoul (KR); KIA MOTORS CORPORATION, Seoul (KR)

(72) Inventors: Dongyeon Han, Seoul (KR); Yo Sub Sim, Gyeongsangbuk-do (KR); Jungwoo Lee, Hwaseong-si (KR); Hyoungjun Cho, Suwon-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 16/815,915

(22) Filed: Mar. 11, 2020

(65) Prior Publication Data

US 2020/0212748 A1 Jul. 2, 2020

Related U.S. Application Data

(62) Division of application No. 15/616,305, filed on Jun. 7, 2017, now Pat. No. 10,637,316.

(30) Foreign Application Priority Data

Dec. 15, 2016 (KR) .................. 10-2016-0171859

(51) Int. Cl.
*H02K 3/28* (2006.01)
*H02K 21/14* (2006.01)
*H02K 3/12* (2006.01)

(52) U.S. Cl.
CPC .............. *H02K 3/28* (2013.01); *H02K 3/12* (2013.01); *H02K 21/14* (2013.01)

(58) Field of Classification Search
CPC .............. H02K 3/28; H02K 3/12; H02K 21/14
USPC ............................................. 310/71
See application file for complete search history.

(56) References Cited

U.S. PATENT DOCUMENTS

| | | | |
|---|---|---|---|
| 4,028,572 A | 6/1977 | Baltisberger | |
| 5,231,324 A | 7/1993 | Kawamura et al. | |
| 7,557,483 B2* | 7/2009 | Yasuhara | H02K 3/28 310/184 |
| 8,232,696 B2* | 7/2012 | Shinkawa | H02K 3/522 310/71 |
| 9,641,035 B2* | 5/2017 | Han | H02K 3/12 |
| 2009/0218906 A1* | 9/2009 | Adachi | H02K 1/165 310/216.069 |

(Continued)

FOREIGN PATENT DOCUMENTS

| CN | 2124524 U | 12/1992 |
|---|---|---|
| CN | 1985425 A | 6/2007 |
| CN | 101986513 A | 3/2011 |

(Continued)

*Primary Examiner* — Jianchun Qin
(74) *Attorney, Agent, or Firm* — Brinks Gilson & Lione

(57) ABSTRACT

A stator of a drive motor is provided. The stator includes a stator coil having three phases and four parallels; a stator core having eight poles and 48 slots; a sixth slot being set as a draw out slot of U phase; a ninth slot being set as a draw out slot of V phase; a twelfth slot being set as a draw out slot of W phase; U1, U3, V1, V4, W1 and W4 phases, a winding draw out direction of which is a clockwise direction; and U2, U4, V2, V3, W2 and W3 phases, a winding draw out direction of which is a counter-anticlockwise direction.

4 Claims, 10 Drawing Sheets

(56) References Cited

U.S. PATENT DOCUMENTS

2014/0184013 A1    7/2014  Han et al.

FOREIGN PATENT DOCUMENTS

| | | |
|---|---|---|
| CN | 102035272 A | 4/2011 |
| CN | 102306991 A | 1/2012 |
| CN | 102598473 A | 7/2012 |
| CN | 102983653 A | 3/2013 |
| CN | 103843234 A | 6/2014 |
| CN | 103915922 A | 7/2014 |
| CN | 105680600 A | 6/2016 |
| KR | 10-1427944 B | 8/2014 |

* cited by examiner

FIG. 2A

|  | Connection direction | Draw out part PITCH | Draw out part length (mm) = Resistance | Note |
|---|---|---|---|---|
| U1 | CW | 5 | 65 | Draw out part diameter Φ200 reference |
| U1 | CCW | 43 | 563 | |
| U2 | CW | 41 | 537 | |
| U2 | CCW | 7 | 92 | |
| U3 | CW | 19 | 249 | |
| U3 | CCW | 29 | 380 | |
| U4 | CW | 31 | 406 | |
| U4 | CCW | 17 | 223 | |

FIG. 2B

|  | Connection direction | Draw out part PITCH | Draw out part length (mm) = Resistance | Note |
|---|---|---|---|---|
| V1 | CW | 4 | 52 | Draw out part diameter Φ200 reference |
| V1 | CCW | 44 | 576 | |
| V2 | CW | 40 | 524 | |
| V2 | CCW | 8 | 105 | |
| V3 | CW | 28 | 367 | |
| V3 | CCW | 20 | 262 | |
| V4 | CW | 16 | 209 | |
| V4 | CCW | 32 | 419 | |

FIG. 2C

|  | Connection direction | Draw out part PITCH | Draw out part length (mm) = Resistance | Note |
|---|---|---|---|---|
| W1 | CW | 3 | 39 | Draw out part diameter Φ200 reference |
| W1 | CCW | 45 | 589 | |
| W2 | CW | 39 | 511 | |
| W2 | CCW | 9 | 118 | |
| W3 | CW | 27 | 353 | |
| W3 | CCW | 21 | 275 | |
| W4 | CW | 15 | 196 | |
| W4 | CCW | 33 | 432 | |

FIG. 3A

| U-V In parallel winding | | Draw out direction | Draw out part length |
|---|---|---|---|
| U1-V1 | CASE1 | U1(CW) + V1(CW) | 118 |
| | CASE2 | U1(CW) + V1(CCW) | 641 |
| | CASE3 | U1(CCW) + V1(CW) | 615 |
| | CASE4 | U1(CCW) + V1(CCW) | 1,139 |
| U2-V2 | CASE1 | U2(CW) + V2(CW) | 1,060 |
| | CASE2 | U2(CW) + V2(CCW) | 641 |
| | CASE3 | U2(CCW) + V2(CW) | 615 |
| | CASE4 | U2(CCW) + V2(CCW) | 196 |
| U3-V3 | CASE1 | U3(CW) + V3(CW) | 615 |
| | CASE2 | U3(CW) + V3(CCW) | 511 |
| | CASE3 | U3(CCW) + V3(CW) | 746 |
| | CASE4 | U3(CCW) + V3(CCW) | 641 |
| U4-V4 | CASE1 | U4(CW) + V4(CW) | 615 |
| | CASE2 | U4(CW) + V4(CCW) | 825 |
| | CASE3 | U4(CCW) + V4(CW) | 432 |
| | CASE4 | U4(CCW) + V4(CCW) | 641 |
| U-V Resistance deviation of draw out part between in parallel winding | | | 393 |

FIG. 3B

| V-W In parallel winding | | Draw out direction | Draw out part length |
|---|---|---|---|
| V1-W1 | CASE1 | V1(CW) + W1(CW) | 92 |
| | CASE2 | V1(CW) + W1(CCW) | 641 |
| | CASE3 | V1(CCW) + W1(CW) | 615 |
| | CASE4 | V1(CCW) + W1(CCW) | 1,139 |
| V2-W2 | CASE1 | V2(CW) + W2(CW) | 1,034 |
| | CASE2 | V2(CW) + W2(CCW) | 641 |
| | CASE3 | V2(CCW) + W2(CW) | 615 |
| | CASE4 | V2(CCW) + W2(CCW) | 223 |
| V3-W3 | CASE1 | V3(CW) + W3(CW) | 720 |
| | CASE2 | V3(CW) + W3(CCW) | 641 |
| | CASE3 | V3(CCW) + W3(CW) | 615 |
| | CASE4 | V3(CCW) + W3(CCW) | 537 |
| V4-W4 | CASE1 | V4(CW) + W4(CW) | 406 |
| | CASE2 | V4(CW) + W4(CCW) | 641 |
| | CASE3 | V4(CCW) + W4(CW) | 615 |
| | CASE4 | V4(CCW) + W4(CCW) | 851 |
| V-W Resistance deviation of draw out part between in parallel winding | | | 445 |

FIG. 3C

| U-W In parallel winding | | Draw out direction | Draw out part length |
|---|---|---|---|
| U1-W1 | CASE1 | U1(CW) + W1(CW) | 105 |
| | CASE2 | U1(CW) + W1(CCW) | 654 |
| | CASE3 | U1(CCW) + W1(CW) | 602 |
| | CASE4 | U1(CCW) + W1(CCW) | 1,152 |
| U2-W2 | CASE1 | U2(CW) + W2(CW) | 1,047 |
| | CASE2 | U2(CW) + W2(CCW) | 654 |
| | CASE3 | U2(CCW) + W2(CW) | 602 |
| | CASE4 | U2(CCW) + W2(CCW) | 209 |
| U3-W3 | CASE1 | U3(CW) + W3(CW) | 602 |
| | CASE2 | U3(CW) + W3(CCW) | 524 |
| | CASE3 | U3(CCW) + W3(CW) | 733 |
| | CASE4 | U3(CCW) + W3(CCW) | 654 |
| U4-W4 | CASE1 | U4(CW) + W4(CW) | 602 |
| | CASE2 | U4(CW) + W4(CCW) | 838 |
| | CASE3 | U4(CCW) + W4(CW) | 419 |
| | CASE4 | U4(CCW) + W4(CCW) | 654 |
| U-W Resistance deviation of draw out part between in parallel winding | | | 419 |

FIG. 4A

| U-V In parallel winding | | Draw out direction | Draw out part length |
|---|---|---|---|
| U1-V1 | CASE1 | U1(CW) + V1(CW) | 118 |
| | CASE2 | U1(CW) + V1(CCW) | 641 |
| | CASE3 | U1(CCW) + V1(CW) | 615 |
| | CASE4 | U1(CCW) + V1(CCW) | 1,139 |
| U2-V2 | CASE1 | U2(CW) + V2(CW) | 1,060 |
| | CASE2 | U2(CW) + V2(CCW) | 641 |
| | CASE3 | U2(CCW) + V2(CW) | 615 |
| | CASE4 | U2(CCW) + V2(CCW) | 196 |
| U3-V3 | CASE1 | U3(CW) + V3(CW) | 615 |
| | CASE2 | U3(CW) + V3(CCW) | 511 |
| | CASE3 | U3(CCW) + V3(CW) | 746 |
| | CASE4 | U3(CCW) + V3(CCW) | 641 |
| U4-V4 | CASE1 | U4(CW) + V4(CW) | 615 |
| | CASE2 | U4(CW) + V4(CCW) | 825 |
| | CASE3 | U4(CCW) + V4(CW) | 432 |
| | CASE4 | U4(CCW) + V4(CCW) | 641 |
| U-V Resistance deviation of draw out part between in parallel winding | | | 26 |

FIG. 4B

| V-W In parallel winding | | Draw out direction | Draw out part length |
|---|---|---|---|
| V1-W1 | CASE1 | V1(CW) + W1(CW) | 92 |
| | CASE2 | V1(CW) + W1(CCW) | 641 |
| | CASE3 | V1(CCW) + W1(CW) | 615 |
| | CASE4 | V1(CCW) + W1(CCW) | 1,139 |
| V2-W2 | CASE1 | V2(CW) + W2(CW) | 1,034 |
| | CASE2 | V2(CW) + W2(CCW) | 641 |
| | CASE3 | V2(CCW) + W2(CW) | 615 |
| | CASE4 | V2(CCW) + W2(CCW) | 223 |
| V3-W3 | CASE1 | V3(CW) + W3(CW) | 720 |
| | CASE2 | V3(CW) + W3(CCW) | 641 |
| | CASE3 | V3(CCW) + W3(CW) | 615 |
| | CASE4 | V3(CCW) + W3(CCW) | 537 |
| V4-W4 | CASE1 | V4(CW) + W4(CW) | 406 |
| | CASE2 | V4(CW) + W4(CCW) | 641 |
| | CASE3 | V4(CCW) + W4(CW) | 615 |
| | CASE4 | V4(CCW) + W4(CCW) | 851 |
| V-W Resistance deviation of draw out part between in parallel winding | | | 26 |

FIG. 4C

| U-W In parallel winding | | Draw out direction | Draw out part length |
|---|---|---|---|
| U1-W1 | CASE1 | U1(CW) + W1(CW) | 105 |
| | CASE2 | U1(CW) + W1(CCW) | 654 |
| | CASE3 | U1(CCW) + W1(CW) | 602 |
| | CASE4 | U1(CCW) + W1(CCW) | 1,152 |
| U2-W2 | CASE1 | U2(CW) + W2(CW) | 1,047 |
| | CASE2 | U2(CW) + W2(CCW) | 654 |
| | CASE3 | U2(CCW) + W2(CW) | 602 |
| | CASE4 | U2(CCW) + W2(CCW) | 209 |
| U3-W3 | CASE1 | U3(CW) + W3(CW) | 602 |
| | CASE2 | U3(CW) + W3(CCW) | 524 |
| | CASE3 | U3(CCW) + W3(CW) | 733 |
| | CASE4 | U3(CCW) + W3(CCW) | 654 |
| U4-W4 | CASE1 | U4(CW) + W4(CW) | 602 |
| | CASE2 | U4(CW) + W4(CCW) | 838 |
| | CASE3 | U4(CCW) + W4(CW) | 419 |
| | CASE4 | U4(CCW) + W4(CCW) | 654 |
| U-W Resistance deviation of draw out part between in parallel winding | | | 419 |

STATOR FOR DRIVING MOTOR

CROSS-REFERENCE TO RELATED APPLICATION

This application is a divisional application of non-provisional U.S. patent application Ser. No. 15/616,305, filed on Jun. 7, 2017, which claims priority to and the benefit of Korean Patent Application No. 10-2016-0171859, filed on Dec. 15, 2016. The entirety of all of related applications are hereby incorporated by reference.

FIELD

The present disclosure relates to a drive motor for an environmentally friendly vehicle. More particularly, the present disclosure relates to a stator of a drive motor using as a power source of electric vehicle and hybrid vehicle.

BACKGROUND

The statements in this section merely provide background information related to the present disclosure and may not constitute prior art.

In general, an environmentally friendly vehicle (a hybrid vehicle or an electric vehicle) may generate a driving torque by an electric motor (hereinafter referred to as "drive motor") which gains a rotating force based on electrical energy.

A hybrid vehicle runs in an electric vehicle (EV) mode, which is a pure electric mode using only power of a drive motor. Alternatively, the hybrid vehicle runs in a hybrid electric vehicle (HEV) mode, which uses driving torques of both an engine and the drive motor for power. Further, a general electric vehicle runs by using a torque of the drive motor as a power source.

For example, a drive motor used as a power source for an environmentally friendly vehicle is generally a permanent magnet synchronous motor (PMSM).

The drive motor as a PMSM serving as a power source of the environmentally friendly vehicle includes a stator to generate a magnetic flux, a rotor spaced apart from the stator by a predetermined gap, and a permanent magnet installed at the rotor.

In this case, the stator includes a plurality of slots which are formed at an inner peripheral portion of a stator core, and a stator coil that is wound in the slots. Accordingly, if an AC current is applied to a stator coil, the stator core is electro-magnetized, and the electro-magnetized stator core, the stator core by an N pole and an S pole and the drive motor as attractive or repulsive force may generate rotation torque.

Meanwhile, a winding path of the stator coil included in the stator may be a series or parallel circuit depending on design of the drive motor. Also, direction of current flowing along the winding path of the stator coil may reverse so that the stator generates alternative magnetic field.

Direction of a coil of stator coil winding in a conventional art is set as in/out so that the stator coil winding may generate alternative magnetic field in a predetermined regulation. However, the winding of the stator coil where in/out direction is predetermined may have a phase draw out part with an excessively high resistance of the stator coil. Further, when the resistance of the phase draw out part creates a deviation, low performance of a motor may be occurred by applied power imbalance (current imbalance), resistance imbalance, torque imbalance and torque ripple.

SUMMARY

In some forms of the present disclosure, a stator of a drive motor may include: a stator coil having three phases (U, V, W) and four parallels (U1~U4, V1~V4, W1~W4); a stator core having eight poles and 48 slots, wherein the stator coil is inserted into a slot configured by four pitches along a clockwise direction in the stator core; a first slot, the first slot being set as a slot that U1 phase is inserted into; a sixth slot, the sixth slot being set as a draw out slot of U phase; a ninth slot, the ninth slot being set as a draw out slot of V phase; a twelfth slot, the twelfth slot being set as a draw out slot of W phase; U1, U3, V1, V4, W1 and W4 phases, wherein a winding draw out direction of the U1, U3, V1, V4, W1 and W4 phases is a clockwise direction; and U2, U4, V2, V3, W2 and W3 phases, wherein a winding draw out direction of the U2, U4, V2, V3, W2 and W3 phases is a counter-clockwise direction.

Further, in the stator of a drive motor in some forms of the present disclosure, when a length (mm) of a draw out part of the stator coils of 3 phases (U, V, W) and 4 in parallel (U1~U4, V1~V4, W1~W4) is the same as a resistance of the draw out part, a draw out length of the U1 and V1 phases may be 118, a draw out length of the U2 and V2 phases may be 196, a draw out length of the U3 and V3 phases may be 511, and a draw out length of the U4 and V4 phases may be 432 in the parallel winding of U and V phases.

Further, in the stator of a drive motor in some forms of the present disclosure, a minimum deviation between the parallel winding of U and V (draw out length of U3 and V3 phases-draw out length of U1 and V1 phases) may be 393.

Further, in the stator of a drive motor in some forms of the present disclosure, a draw out length of the V1 and W1 phases may be 92, a draw out length of the V2 and W2 phases may be 223, a draw out length of the V3 and W3 phases may be 537, and a draw out length of the V4 and W4 phases may be 406 in the parallel winding of V and W phases.

Further, in the stator of a drive motor in some forms of the present disclosure, a minimum deviation between the parallel winding of V and W (draw out length of V3 and W3 phases-draw out length of V1 and W1 phases) may be 445.

Further, in the stator of a drive motor in some forms of the present disclosure, a draw out length of the U1 and W1 phases may be 105, a draw out length of the U2 and W2 phases may be 209, a draw out length of the U3 and W3 phases may be 524, and a draw out length of the U4 and W4 phases may be 419 in the parallel winding of V and W phases.

Further, in the stator of a drive motor in some forms of the present disclosure, a minimum deviation between the parallel winding of U and W (draw out length of U3 and W3 phases-draw out length of U1 and W1 phases) may be 419.

A stator of a drive motor according to another form of the present disclosure including: a stator coil having three phases (U, V, W) and four in-parallels (U1-U4, V1-V4, W1-W4); a stator core having eight poles and 48 slots, wherein the stator coil is inserted into a slot configured by four pitches along a clockwise direction in the stator core; a first slot, the first slot being set as a slot that U1 phase is inserted into; a sixth slot, the sixth slot being set as a draw out slot of U phase; a ninth slot, the ninth slot being set as a draw out slot of V phase; a twelfth slot, the twelfth slot being set as a draw out slot of W phase; U1, U3, V2, V3, W1 and W4 phases, where a winding draw out direction of the U1, U3, V2, V3, W1 and W4 phases is a clockwise direction; and U2, U4, V1, V4, W2 and W3 phases, where a winding draw out direction of the U2, U4, V1, V4, W2 and W3 phases is a counter-clockwise direction.

Further, in the stator of a drive motor in some forms of the present disclosure, when a length (mm) of draw out part of the stator coils of 3 phases (U, V, W) and 4 in parallel (U1~U4, V1~V4, W1~W4) is the same as a resistance of the draw out part, a draw out length of the U1 and V1 phases may be 641, a draw out length of the U2 and V2 phases may be 615, a draw out length of the U3 and V3 phases may be 615, and a draw out length of the U4 and V4 phases may be 641 in the parallel winding of U and V phases.

Further, in the stator of a drive motor in some forms of the present disclosure, a minimum deviation between the parallel winding of U and V (draw out length of U1 and V1 phases-draw out length of U2 and V2 phases), (draw out length of U1 and V1 phases-draw out length of U3 and V3 phases), (draw out length of U4 and V4 phases-draw out length of U2 and V2 phases) and (draw out length of U4 and V4 phases-draw out length of U3 and V3 phases) may be 26.

Further, in the stator of a drive motor in some forms of the present disclosure, a draw out length of the V1 and W1 phases may be 615, a draw out length of the V2 and W2 phases may be 641, a draw out length of the V3 and W3 phases may be 641, and a draw out length of the V4 and W4 phases may be 615 in the parallel winding of V and W phases.

Further, in the stator of a drive motor in some forms of the present disclosure, a minimum deviation between the parallel winding of V and W (draw out length of V2 and W2 phases-draw out length of V1 and W1 phases), (draw out length of V2 and W2 phases-draw out length of V4 and W4 phases), (draw out length of V3 and W3 phases-draw out length of V1 and W1 phases) and (draw out length of V3 and W3 phases-draw out length of V4 and W4 phases) may be 26.

Further, in the stator of a drive motor in some forms of the present disclosure, a draw out length of the U1 and W1 phases may be 105, a draw out length of the U2 and W2 phases may be 209, a draw out length of the U3 and W3 phases may be 524, and a draw out length of the U4 and W4 phases may be 419 in the in parallel winding of V and W phases.

Further, in the stator of a drive motor in some forms of the present disclosure, a minimum deviation between the parallel winding of U and W (draw out length of U3 and W3 phases-draw out length of U1 and W1 phases) may be 419.

In some forms of the present disclosure, performance of a drive motor may be improved by decreasing a draw out part resistance between the parallel windings and solving imbalance of draw out resistance of each phase by connecting each phase coil in a connection direction in a way that length and resistance of each draw out part is minimal.

Further, in some forms of the present disclosure, performance of a drive motor may be improved by solving imbalance of a draw out resistance of each phase by connecting each phase coil in a connection direction reducing a draw out part resistance deviation between the parallel windings of each phase.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 2A to 2C are tables showing a draw out part length of a winding direction of a stator coil applied to a stator of a drive motor;

FIGS. 3A to 3C are tables showing a connection pattern reducing a draw out part resistance of a stator coil applied to a stator of a drive motor; and FIGS. 4A to 4C are tables showing a connection pattern reducing a draw out part resistance deviation of a stator coil applied to a stator of a drive motor.

DETAILED DESCRIPTION

Figure 1:
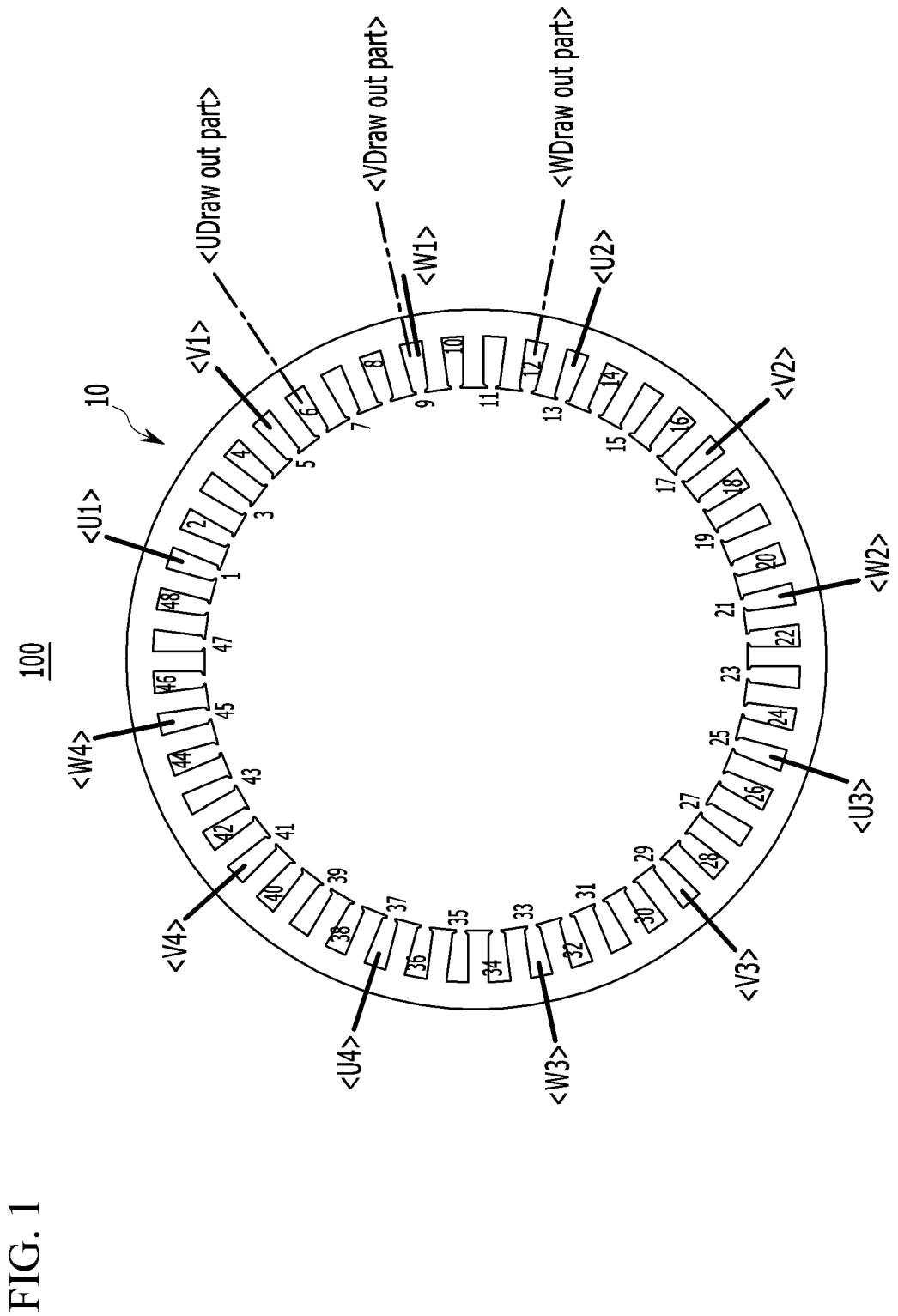
FIG. 1 is a drawing illustrating a connection structure of a stator coil applied to a stator of a drive motor.

The following description is merely exemplary in nature and is not intended to limit the present disclosure, application, or uses. It should be understood that throughout the drawings, corresponding reference numerals indicate like or corresponding parts and features.

FIG. 1 is a drawing illustrating a connection structure of a stator coil applied to a stator of a drive motor in some forms of the present disclosure.

Referring to FIG. 1, a stator 100 of a drive motor in some forms of the present disclosure may be applied to a drive motor a hybrid vehicle and/or electric vehicle obtaining operation force by electrical energy from environmentally friendly vehicle.

For example, the drive motor may be applied to a permanent magnet synchronous motor (PMSM). This drive motor includes a stator 100 in some forms of the present disclosure, a rotor (not shown in drawings) spaced apart from the stator 100 by a predetermined gap, and a plurality of permanent magnets (not shown in drawings) installed at the rotor.

Although some forms of the present disclosure illustrate that the permanent magnet synchronous motor is applied to a permanent magnet type of drive motor as a drive motor used in the environmentally friendly vehicle, the scope of the present disclosure is not limited thereto. A technical scope of the present disclosure is applicable to various types and purposes of a permanent magnet type of drive motor.

Here, the stator 100 includes a stator core 10 in which a plurality of steel sheets are laminated. The stator core 10 is formed as a hollow cylinder shape. A rotor (not shown in drawings) is disposed at the hollow of the stator core 10.

The stator core 10 includes a plurality of slots formed facing toward a center shaft along a circumference direction. That is, the stator core 10 includes a number of slots being a multiple of the number of poles×the number of phases. Further, a stator coil of distribution winding type is wound around the slots.

The stator 100 of the drive motor in some forms of the present disclosure includes a stator core 10 of 8 poles and 48 slots, for example, and a stator coil of 3 phases (U, V, W) and four parallels (U1~U4, V1~V4, W1~W4) is wound around slots of the stator core 10.

The 48 slots 1 to 48 are radially formed from a hollow portion of the stator core 10. Also, the 48 slots 1 to 48 may have the same shape.

Further, the 3 phases (U, V, W) with 4 parallels (U1~U4, V1~V4, W1~W4) means phases having different positions of an N pole and an S pole of an electro-magnetized stator core 10 by allowing a current to flow through different paths in the stator coil.

Some forms of the present disclosure has reference when a stator coil of 3 phases (U, V, W) and four parallels (U1~U4, V1~V4, W1~W4) is inserted into a slot configured by 4 pitches along a clockwise direction, and a slot into which U1 phase is inserted is set as first slot, and sixth, ninth and twelfth slots are set as each draw out slots of 3 phases (U, V, W).

For example, the coil on the U1 is inserted into first slot, the coil on the V1 is inserted into fifth slot, and the coil on the W1 is inserted into ninth slot. The coil on the U2 is inserted into thirteenth slot, the coil on the V2 is inserted into seventeenth slot, and the coil on the W2 is inserted into twenty-first slot. The coil on the U3 is inserted into twenty-fifth slot, the coil on the V3 is inserted into twenty-ninth slot, and the coil on the W3 is inserted into thirty-third slot. Further, the coil on the U4 is inserted into thirty-seventh slot, the coil on the V4 is inserted into forty-first slot, and the coil on the W4 is inserted into forty-fifth slot.

Further, the coil of U phase including phases of U1~U4 may be drawn out to sixth slot, the coil of V phase including phases of V1~V4 may be drawn out to ninth slot, and the coil of W phase including phases of W1~W4 may be drawn out to twelfth slot.

FIGS. 2A to 2C show a draw out part pitch and a draw out part length (mm) according to coil connection direction (clockwise direction or counter-clockwise direction) when the coils of phases of U1~U4, V1~V4, and W1~W4 are inserted into the each slot and drawn out to each draw out slots of 3 phases (U, V, W). Here, it means that the draw out part length is the same as a draw out part resistance between the parallel windings of each phase coil.

The stator 100 of a drive motor in some forms of the present disclosure provides a connection structure of a stator coil which reduces resistance of the draw out part between parallel windings of each phase of the stator coils and solves resistance imbalance of each phase draw out part to improve performance of the drive motor.

For this, in some forms of the present disclosure, as shown in FIGS. 2A to 2C and FIGS. 3A to 3C, a winding draw out direction of U1, U3, V1, V4, W1, and W4 phases may be predetermined to be a clockwise direction, and a winding draw out direction of U2, U4, V2, V3, W2 and W3 phases may be predetermined to be a counter-clockwise direction.

A draw out length of the U1 and V1 phases is 118, a draw out length of the U2 and V2 phases is 196, a draw out length of the U3 and V3 phases is 511, and a draw out length of the U4 and V4 phases is 432 in the parallel winding of U and V phases.

In the parallel windings of U1 and V1 phases, the coil on the U1 phase is connected with the first slot in a clockwise direction and drawn out to U phase draw out part of the sixth slot. The coil on the V1 phase is connected with the fifth slot in a clockwise direction, and the draw out part length is 118 when the coil on the V1 phase is drawn out to V phase draw out part of the ninth slot (case 1 in the drawing). In this case, the length is minimal when compared to the length of other cases with different connection direction (draw out direction), and a draw out resistance is also minimal.

In the parallel windings of U2 and V2 phases, the coil on the U2 phase is connected with the thirteenth slot in a counter-clockwise direction and drawn out to U phase draw out part of the sixth slot. The coil on the V2 phase is connected with the seventeenth slot in a counter-clockwise direction, and the draw out part length is 196 when the coil on the V2 phase is drawn out to V phase draw out part of the ninth slot (case 4 in the drawing). In this case, the length is minimal when compared to the length of other with different connection direction (draw out direction), and a draw out resistance is also minimal.

In the parallel windings of U3 and V3 phases, the coil on the U3 phase is connected with the twenty fifth slot in a clockwise direction and drawn out to U phase draw out part of the sixth slot. The coil on the V3 phase is connected with the twenty ninth slot in a counter-clockwise direction, and the draw out part length is 511 when the coil on the V3 phase is drawn out to V phase draw out part of the ninth slot (case 2 in the drawing). In this case, the length is minimal when compared to the length of other cases with different connection direction (draw out direction), and a draw out resistance is also minimal.

In the parallel windings of U4 and V4 phases, the coil on the U4 phase is connected with the thirty seventh slot in a counter-clockwise direction and drawn out to U phase draw out part of the sixth slot. The coil on the V4 phase is connected with the forty first slot in a clockwise direction, and the draw out part length is 432 when the coil on the V4 phase is drawn out to V phase draw out part of the ninth slot (case 3 in the drawing). In this case, the length is minimal when compared to the length of other cases with different connection direction (draw out direction), and a draw out resistance is also minimal.

In addition, a minimum deviation between the parallel winding of U and V (draw out length (511) of U3 and V3 phases-draw out length (118) of U1 and V1 phases) is 393.

A draw out length of the V1 and W1 phases is 92, a draw out length of the V2 and W2 phases is 223, a draw out length of the V3 and W3 phases is 537, and a draw out length of the V4 and W4 phases is 406 in the parallel winding of V and W phases.

In the parallel windings of V1 and W1 phases, the coil on the V1 phase is connected with the fifth slot in a clockwise direction and drawn out to V phase draw out part of the ninth slot. The coil on the W1 phase is connected with the ninth slot in a clockwise direction, and the draw out part length is 92 when the coil on the W1 phase is drawn out to W phase draw out part of the twelfth slot (case 1 in the drawing). In this case, the length is minimal when compared to the length of other cases with different connection directions (draw out direction), and a draw out resistance is also minimal.

In the parallel windings of V2 and W2 phases, the coil on the V2 phase is connected with the seventeenth slot in a counter-clockwise direction and drawn out to V phase draw out part of the ninth slot. The coil on the W2 phase is connected with the twenty first slot in a counter-clockwise direction, and the draw out part length is 223 when the coil on the W2 phase is drawn out to W phase draw out part of the twelfth slot (case 4 in the drawing). In this case, the length is minimal when compared to the length of other cases with different connection directions (draw out direction), and a draw out resistance is also minimal.

In the parallel windings of V3 and W3 phases, the coil on the V3 phase is connected with the twenty ninth slot in a counter-clockwise direction and drawn out to V phase draw out part of the ninth slot. The coil on the W3 phase is connected with the thirty third slot in a counter-clockwise direction, and the draw out part length is 537 when the coil on the W3 phase is drawn out to W phase draw out part of the twelfth slot (case 4 in the drawing). In this case, the length is minimal when compared to the length of other cases with different connection directions (draw out direction), and a draw out resistance is also minimal.

In the parallel windings of V4 and W4 phases, the coil on the V4 phase is connected with the forty first slot in a clockwise direction and drawn out to V phase draw out part of the ninth slot. The coil on the W4 phase is connected with the forty fifth slot in a clockwise direction, and the draw out part length is 406 when the coil on the W4 phase is drawn out to W phase draw out part of the twelfth slot (case 4 in the drawing). In this case, the length is minimal when compared to the length of other cases with different connection directions (draw out direction), and a draw out resistance is also minimal.

In addition, a minimum deviation between the parallel winding of V and W (draw out length (537) of V3 and W3 phases-draw out length (92) of V1 and W1 phases) is 445.

A draw out length of the U1 and W1 phases is 105, a draw out length of the U2 and W2 phases is 209, a draw out length of the U3 and W3 phases is 524, and a draw out length of the U4 and W4 phases is 419 in the parallel winding of V and W phases.

In the parallel windings of U1 and W1 phases, the coil on the U1 phase is connected with the first slot in a clockwise direction and drawn out to U phase draw out part of the sixth slot. The coil on the W1 phase is connected with the ninth slot in a clockwise direction, and the draw out part length is 105 when the coil on the W1 phase is drawn out to W phase draw out part of the twelfth slot (case 1 in the drawing). In this case, the length is minimal when compared to the length of other cases with different connection directions (draw out direction), and a draw out resistance is also minimum.

In the parallel windings of U2 and W2 phases, the coil on the U2 phase is connected with the thirteenth slot in a counter-clockwise direction and drawn out to U phase draw out part of the sixth slot. The coil on the W2 phase is connected with the twenty first slot in a counter-clockwise direction, and the draw out part length is 209 when the coil on the W2 phase is drawn out to W phase draw out part of the twelfth slot (case 4 in the drawing). In this case, the length is minimal when compared to the length of other cases with different connection directions (draw out direction), and a draw out resistance is also minimal.

In the parallel windings of U3 and W3 phases, the coil on the U3 phase is connected with the twenty fifth slot in a clockwise direction and drawn out to U phase draw out part of the sixth slot. The coil on the W3 phase is connected with the thirty third slot in a counter-clockwise direction, and the draw out part length is 524 when the coil on the W3 phase is drawn out to W phase draw out part of the twelfth slot (case 2 in the drawing). In this case, the length is minimal when compared to the length of other cases with different connection directions (draw out direction), and a draw out resistance is also minimal.

In the parallel windings of U4 and W4 phases, the coil on the U4 phase is connected with the thirty seventh slot in a counter-clockwise direction and drawn out to U phase draw out part of the sixth slot. The coil on the W4 phase is connected with the forty fifth slot in a clockwise direction, and the draw out part length is 419 when the coil on the W4 phase is drawn out to W phase draw out part of the twelfth slot (case 3 in the drawing). In this case, the length is minimal when compared to the length of other cases with different connection directions (draw out direction), and a draw out resistance is also minimal.

In addition, a minimum deviation between the parallel winding of U and W (draw out length (524) of U3 and W3 phases-draw out length (105) of U1 and W1 phases) is 419.

Accordingly, in the structure of 3 phases (U, V, W) and 4 in parallel (U1~U4, V1~V4, W1~W4), the coils of each phase is connected in a connecting direction (draw out direction) in a way that the length and resistance of each draw out part becomes minimal. As a result, performance of a drive motor may be improved because the draw out part resistance between the parallel windings is decreased and imbalance of the draw out resistance in each phase is resolved.

Meanwhile, to improve performance of the drive motor, the stator 100 of a drive motor in some forms of the present disclosure provides a connection structure of a stator coil which decreases resistance deviation of the draw out part between parallel windings of each phase of the stator coils and solves resistance imbalance of draw out part in each phase.

In some forms of the present disclosure, as shown in FIGS. 2A to 2C and FIGS. 4A to 4C, a winding draw out direction of U1, U3, V2, V3, W1, and W4 phases may be predetermined to be a clockwise direction, and a winding draw out direction of U2, U4, V1, V4, W2 and W3 phases may be predetermined to be a counter-clockwise direction.

A draw out length of the U1 and V1 phases is 641, a draw out length of the U2 and V2 phases is 615, a draw out length of the U3 and V3 phases is 615, and a draw out length of the U4 and V4 phases is 641 in the parallel winding of U and V phases.

In the parallel windings of U1 and V1 phases, the coil on the U1 phase is connected with the first slot in a clockwise direction and drawn out to U phase draw out part of the sixth slot. The coil on the V1 phase is connected with the fifth slot in a counter-clockwise direction, and the draw out part length is 641 when the coil on the V1 phase is drawn out to V phase draw out part of the ninth slot (case 2 in the drawing).

In this case, the parallel connection directions of U1 and V1 phases are not set as similar to cases 1 and 3 despite a length of draw out part of U1 and V1 phases is less than 641 in those cases. It is for the purpose of setting the parallel connection directions of U1 and V1 phases as one of the cases having a minimum resistance deviation of draw out part.

Further, in case 3 where a minimum resistance deviation of the draw out part, a draw out part of U1 phase is longer than that of case 2, it is not set as the parallel connection direction of U1 and V1 phase.

In the parallel windings of U2 and V2 phases, the coil on the U2 phase is connected with the thirteenth slot in a counter-clockwise direction and drawn out to U phase draw out part of the sixth slot. The coil on the V2 phase is connected with the seventeenth slot in a clockwise direction, and the draw out part length is 615 when the coil on the V2 phase is drawn out to V phase draw out part of the ninth slot (case 3 in the drawing).

In this case, the parallel connection directions of U2 and V2 phases are not set as similar to case 4 despite a length of draw out part of U2 and V2 phases is less than 615 in that case it is for the purpose of setting the parallel connection directions of U2 and V2 phases as one of the cases having a minimum resistance deviation of draw out part.

Further, in case 2 where a minimum resistance deviation of the draw out part, a draw out part of U2 phase is longer than that of case 3, it is not set as the parallel connection direction of U2 and V2 phase.

In the parallel windings of U3 and V3 phases, the coil on the U3 phase is connected with the twenty fifth slot in a clockwise direction and drawn out to U phase draw out part of the sixth slot, the coil on the V3 phase is connected with the twenty ninth slot in a clockwise direction, and the draw out part length is 615 when the coil on the V3 phase is drawn out to V phase draw out part of the ninth slot (case 1 in the drawing).

In this case, the parallel connection directions of U3 and V3 phases are not set as similar to case 2 despite a length of draw out part of U3 and V3 phases is less than 615 in that case 2. It is for the purpose of setting the parallel connection directions of U3 and V3 phases as one of the cases having a minimum resistance deviation of draw out part.

Further, in case 4 where a minimum resistance deviation of the draw out part, a draw out part of U3 phase is longer than that of case 1, it is not set as in the parallel connection direction of U3 and V3 phase.

In the parallel windings of U4 and V4 phases, the coil on the U4 phase is connected with the thirty seventh slot in a counter-clockwise direction and drawn out to U phase draw out part of the sixth slot, the coil on the V4 phase is connected with the forty first slot in a counter-clockwise direction, and the draw out part length is 641 when the coil on the V4 phase is drawn out to V phase draw out part of the ninth slot (case 4 in the drawing).

In this case, the parallel connection directions of U4 and V4 phases are not set as similar to cases 1 and 3 despite a length of draw out part of U4 and V4 phases is less than 641 in those cases. It is for the purpose of setting the parallel connection directions of U4 and V4 phases as one of the cases having a minimum resistance deviation of draw out part.

Further, in case 1 where a minimum resistance deviation of the draw out part, a draw out part of U4 phase is longer than that of case 4, it is not set as the parallel connection direction of U4 and V4 phase.

Here, a minimum deviation between the parallel winding of U and V, which is (a draw out length (641) of U1 and V1 phases-a draw out length (615) of U2 and V2 phases), (a draw out length (641) of U1 and V1 phases-a draw out length (615) of U3 and V3 phases), (a draw out length (641) of U4 and V4 phases-a draw out length (615) of U2 and V2 phases) and (a draw out length (641) of U4 and V4 phases-a draw out length (615) of U3 and V3 phases) may be 26.

A draw out length of the V1 and W1 phases is 615, a draw out length of the V2 and W2 phases is 641, a draw out length of the V3 and W3 phases is 641, and a draw out length of the V4 and W4 phases is 615 in the parallel winding of V and W phases.

In the parallel windings of V1 and W1 phases, the coil on the V1 phase is connected with the fifth slot in a counter-clockwise direction and drawn out to V phase draw out part of the ninth slot The coil on the W1 phase is connected with the ninth slot in a clockwise direction, and the draw out part length is 615 when the coil on the W1 phase is drawn out to W phase draw out part of the twelfth slot (case 3 in the drawing).

In this case, the parallel connection directions of V1 and W1 phases are not set as similar to case 1 despite a length of draw out part of V1 and W1 phases is less than 615 in that case. It is for the purpose of setting the parallel connection directions of V1 and W1 phases as one of the cases having a minimum resistance deviation of draw out part.

Further, in case 2 where a minimum resistance deviation of the draw out part, a draw out part of W1 phase is longer than that of case 3, it is not set as the parallel connection direction of V1 and W1 phase.

In the in parallel windings of V2 and W2 phases, the coil on the V2 phase is connected with the seventeenth slot in a clockwise direction and drawn out to V phase draw out part of the ninth slot, the coil on the W2 phase is connected with the twenty first slot in a counter-clockwise direction, and the draw out part length is 641 when the coil on the W2 phase is drawn out to W phase draw out part of the twelfth slot (case 2 in the drawing).

In this case, the parallel connection directions of V2 and W2 phases are not set as similar to cases 3 and 4 despite a length of draw out part of V2 and W2 phases is less than 641 in those cases. It is for the purpose of setting the parallel connection directions of V2 and W2 phases as one of the cases having a minimum resistance deviation of draw out part.

Further, in case 3 where a minimum resistance deviation of the draw out part, a draw out part of W2 phase is longer than that of case 2, it is not set as the parallel connection direction of V2 and W2 phase.

In the parallel windings of V3 and W3 phases, the coil on the V3 phase is connected with the twenty ninth slot in a clockwise direction and drawn out to V phase draw out part of the ninth slot. The coil on the W3 phase is connected with the thirty third slot in a counter-clockwise direction, and the draw out part length is 641 when the coil on the W3 phase is drawn out to W phase draw out part of the twelfth slot (case 2 in the drawing).

In this case, the parallel connection directions of V3 and W3 are not set as similar to cases 3 and 4 despite a length of draw out part of V3 and W3 phases is less than 641 in those cases. It is for the purpose of setting the parallel connection directions of V3 and W3 phases as one of the cases having a minimum resistance deviation of draw out part.

Further, in case 3 where a minimum resistance deviation of the draw out part, a draw out part of W3 phase is longer than that of case 2, it is not set as the parallel connection direction of V3 and W3 phase.

In the parallel windings of V4 and W4 phases, the coil on the V4 phase is connected with the forty first slot in a counter-clockwise direction and drawn out to V phase draw out part of the ninth slot, the coil on the W4 phase is connected with the forty fifth slot in a clockwise direction, and the draw out part length is 615 when the coil on the W4 phase is drawn out to W phase draw out part of the twelfth slot (case 3 in the drawing).

In this case, the parallel connection directions of V4 and W4 phases are not set as similar to case 1 despite a length of draw out part of V4 and W4 phases is less than 615 in that case. It is for the purpose of setting the parallel connection directions of V4 and W4 phases as one of the cases having a minimum resistance deviation of draw out part.

Further, in case 2 where having a minimum resistance deviation of the draw out part, a draw out part of W4 phase is longer than that of case 3, it is not set as the parallel connection direction of V4 and W4 phase.

Here, a minimum deviation between the parallel winding of V and W which is (a draw out length (641) of V2 and W2 phases-a draw out length (615) of V1 and W1 phases), (a draw out length (641) of V2 and W2 phases-a draw out length (615) of V4 and W4 phases), (a draw out length (641) of V3 and W3 phases-a draw out length (615) of V1 and W1 phases) and (a draw out length (641) of V3 and W3 phases-a draw out length (615) of V4 and W4 phases) may be 26.

A draw out length of the U1 and W1 phases is 105, a draw out length of the U2 and W2 phases is 209, a draw out length of the U3 and W3 phases is 524, and a draw out length of the U4 and W4 phases is 419 in the parallel winding of U and W phases.

In the parallel windings of U1 and W1 phases, the coil on the U1 phase is connected with the first slot in a clockwise direction and drawn out to U phase draw out part of the sixth slot The coil on the W1 phase is connected with the ninth slot in a clockwise direction, and the draw out part length is 105 when the coil on the W1 phase is drawn out to W phase draw out part of the twelfth slot (case 1 in the drawing).

In this case, the parallel connection directions of U1 and W1 phases are not set as similar to cases 2 and 3 despite a resistance deviation per a length of draw out part of U1 and W1 phases is small those cases. Otherwise, the coils of the U1 and W1 phases become so entangled with the coils of the other phases.

In the parallel windings of U2 and W2 phases, the coil on the U2 phase is connected with the thirteenth slot in a counter-clockwise direction and drawn out to U phase draw out part of the sixth slot, the coil on the W2 phase is connected with the twenty first slot in a counter-clockwise direction, and the draw out part length is 209 when the coil on the W2 phase is drawn out to W phase draw out part of the twelfth slot (case 4 in the drawing).

In this case, the parallel connection directions of U2 and W2 phases are not set as similar to cases 2 and 3 despite a resistance deviation per a length of draw out part of U2 and W2 phases is small those cases. Otherwise, the coils of the U2 and W2 phases become so entangled with the coils of the other phases.

In the parallel windings of U3 and W3 phases, the coil on the U3 phase is connected with the twenty fifth slot in a clockwise direction and drawn out to U phase draw out part of the sixth slot. The coil on the W3 phase is connected with the thirty third slot in a counter-clockwise direction, and the draw out part length is 524 when the coil on the W3 phase is drawn out to W phase draw out part of the twelfth slot (case 2 in the drawing).

In this case, the parallel connection directions of U3 and W3 phases are not set as similar to cases 1 and 4 despite a resistance deviation per a length of draw out part of U3 and W3 phases is small those cases. Otherwise, the coils of the U3 and W3 phases become so entangled with the coils of the other phases.

In the parallel windings of U4 and W4 phases, the coil on the U4 phase is connected with the thirty seventh slot in a counter-clockwise direction and drawn out to U phase draw out part of the sixth slot, the coil on the W4 phase is connected with the forty fifth slot in a clockwise direction, and the draw out part length is 419 when the coil on the W4 phase is drawn out to W phase draw out part of the twelfth slot (case 3 in the drawing).

In this case, the parallel connection directions of U4 and W4 phases are not set as similar to cases 1 and 4 despite a resistance deviation per a length of draw out part of U4 and W4 phases is small those cases. Otherwise, the coils of the U4 and W4 phases become so entangled with the coils of the other phases.

Here, a minimum deviation between the parallel winding of U and W, which is (a draw out length (524) of U3 and W3 phases-a draw out length (105) of U1 and W1 phases), may be 419.

Accordingly, in the structure of 3 phases (U, V, W) and 4 in parallel (U1~U4, V1~V4, W1~W4), the coils of each phase is connected in a connecting direction (draw out direction) in a way that the length and resistance of each draw out part becomes minimal. As a result, performance of a drive motor may be improved because the draw out part resistance between the parallel windings is decreased and imbalance of the draw out resistance in each phase is resolved. The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A stator of a drive motor comprising:
   a stator coil having three phases (U, V, W) and four in-parallel windings (U1~U4, V1~V4, W1~W4);
   a stator core having eight poles and 48 slots, wherein the stator coil is inserted into a slot configured by four pitches along a clockwise direction in the stator core;
   a first slot, the first slot being set as a slot that U1 phase is inserted into;
   a sixth slot, the sixth slot being set as a draw out slot of U phase;
   a ninth slot, the ninth slot being set as a draw out slot of V phase;
   a twelfth slot, the twelfth slot being set as a draw out slot of W phase;
   U1, U3, V2, V3, W1 and W4 phases, wherein a winding draw out direction of the U1, U3, V2, V3, W1 and W4 phases is a clockwise direction; and
   U2, U4, V1, V4, W2 and W3 phases, wherein a winding draw out direction of the U2, U4, V1, V4, W2 and W3 phases is a counter-clockwise direction.

2. The stator of claim 1, wherein:
   when a length (mm) of a draw out part of the stator coil is the same as a resistance of the draw out part,
   a draw out length of the U1 and V1 phases is 641, a draw out length of the U2 and V2 phases is 615, a draw out length of the U3 and V3 phases is 615, and a draw out length of the U4 and V4 phases is 641 in the parallel winding of U and V phases, and a minimum deviation between the parallel winding of U and V phases is 26, wherein the minimum deviation is based on the draw out length of U1 and V1 phases less the draw out length of U2 and V2 phases, the draw out length of U1 and V1 phases less the draw out length of U3 and V3 phases, the draw out length of U4 and V4 phases less the draw out length of U2 and V2 phases, or the draw out length of U4 and V4 phases less the draw out length of U3 and V3 phases.

3. The stator of claim 2, wherein:
   a draw out length of the V1 and W1 phases is 615, a draw out length of the V2 and W2 phases is 641, a draw out length of the V3 and W3 phases is 641, and a draw out length of the V4 and W4 phases is 615 in the parallel winding of V and W phases, and a minimum deviation between the parallel winding of V and W phases is 26, wherein the minimum deviation is based on the draw out length of V2 and W2 phases less the draw out length of V1 and W1 phases, the draw out length of V2 and W2 phases less the draw out length of V4 and W4 phases, the draw out length of V3 and W3 phases less the draw out length of V1 and W1 phases, or the draw out length of V3 and W3 phases less the draw out length of V4 and W4 phases.

4. The stator of claim 3, wherein:
   a draw out length of the U1 and W1 phases is 105, a draw out length of the U2 and W2 phases is 209, a draw out length of the U3 and W3 phases is 524, and a draw out length of the U4 and W4 phases is 419 in the parallel winding of U and W phases, and a minimum deviation between the parallel winding of U and W phases is 419, wherein the minimum deviation is based on the draw out length of U3 and W3 phases less the draw out length of U1 and W1 phases.

\* \* \* \* \*